United States Patent
Stanglmaier et al.

(10) Patent No.: US 6,240,912 B1
(45) Date of Patent: Jun. 5, 2001

(54) METHOD FOR IN-CYLINDER CATALYTIC OXIDATION OF HYDROCARBONS IN DIRECT INJECTED SPARK IGNITION ENGINES

(75) Inventors: Rudolf H. Stanglmaier; Charles E. Roberts, both of San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 09/435,414

(22) Filed: Nov. 8, 1999

(51) Int. Cl.$^7$ .................................................. F02B 51/02
(52) U.S. Cl. ................................................................ 123/670
(58) Field of Search .................................... 123/299, 305, 123/670

(56) References Cited

U.S. PATENT DOCUMENTS

| | | |
|---|---|---|
| 2,973,360 | 4/1961 | Bradstreet et al. . |
| 4,530,340 | 7/1985 | Totman . |
| 4,773,368 | 9/1988 | Pfefferle . |
| 4,811,707 | 3/1989 | Pfefferle . |
| 4,819,595 | 4/1989 | Pfefferle . |
| 4,905,658 | 3/1990 | Pfefferle . |
| 5,806,483 | * 9/1998 | Mitarai et al. ........................ 123/299 |

OTHER PUBLICATIONS

"The Effect of In–Cylinder Wall Wetting Location on the HC Emissions from SI Engines", SAE Technical Paper Series 199–01–0502, Stanglmaier, R.H. and Li, Jianwen and Mathews, Ronald International Congress and Exposition, Detroit, Michigan, Mar. 1–4, 1999.

* cited by examiner

Primary Examiner—John Kwon
(74) Attorney, Agent, or Firm—Baker Botts L.L.P.

(57) ABSTRACT

Hydrocarbon emissions from direct injected spark ignition engines are reduced as a result of post-flame oxidation by a catalytic material deposited on the top of a piston disposed in the engine.

2 Claims, 1 Drawing Sheet

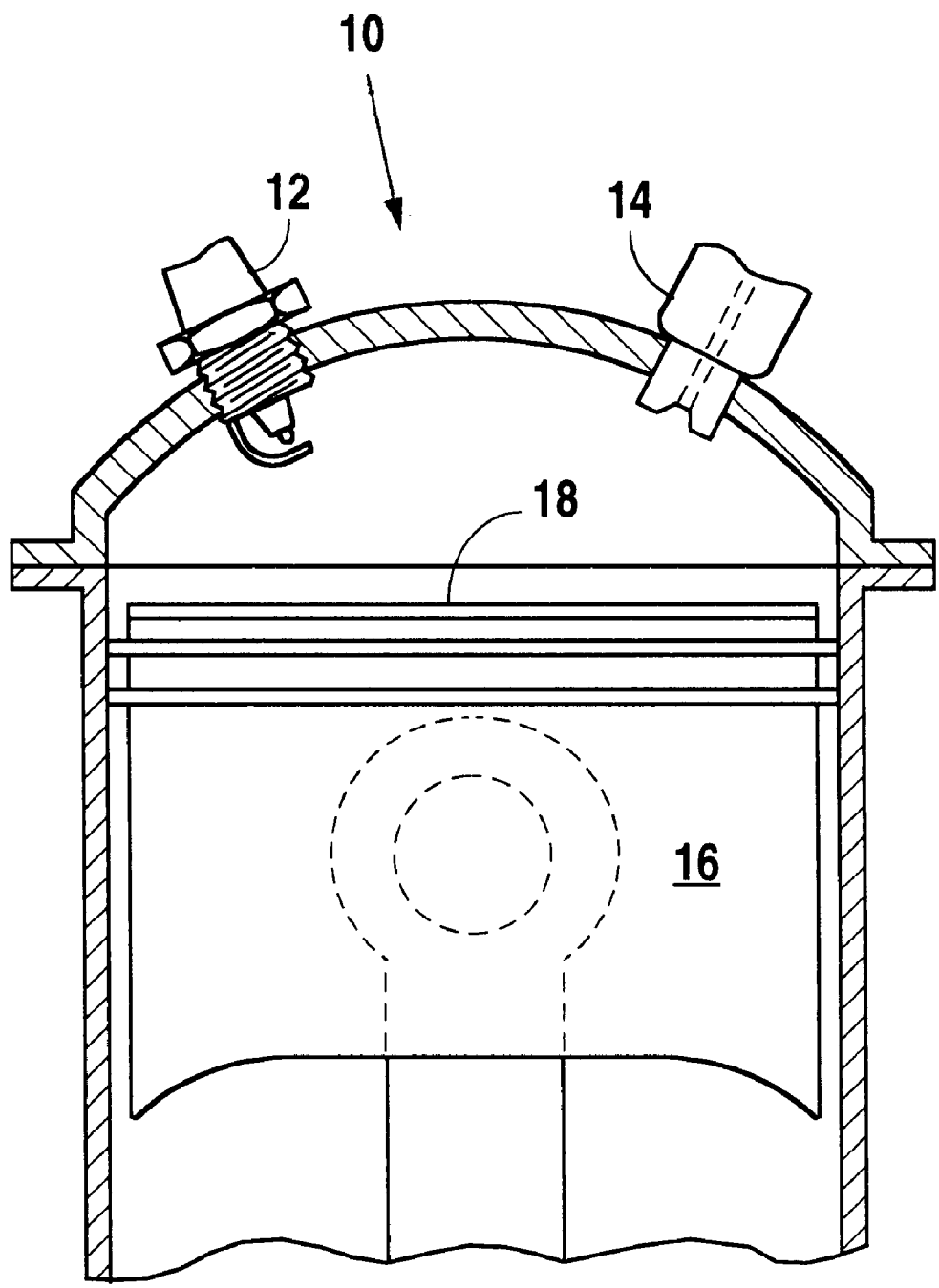

METHOD FOR IN-CYLINDER CATALYTIC OXIDATION OF HYDROCARBONS IN DIRECT INJECTED SPARK IGNITION ENGINES

BACKGROUND OF THE INVENTION

1. Technical Field

This invention relates generally to a method for reducing hydrocarbon emissions in direct injected spark ignition engines, and more particularly to such a method using a catalytic oxidative coating on a piston for post-combustion oxidation of hydrocarbons during an expansion stroke of the engine.

2. Background Art

There is world-wide interest directed to the development of internal combustion engines with fuel injection systems which introduce fuel directly into a combustion chamber. Direct injection is advantageous for several reasons, including improved efficiency and reduced fuel consumption. However, direct injected gasoline engines produce significantly higher levels of hydrocarbon (HC) emissions than comparable port-fuel injected engines. One of the main mechanisms responsible for high HC emissions in direct injected gasoline engines has been found to be attributable to the deposition of liquid fuel on the surfaces of the combustion chamber (i.e., the piston top, cylinder liner, etc.). This phenomenon is generally referred to as combustion chamber wall wetting, and is most predominant when fuel is injected late during the compression stroke. Most current directed injected, spark ignition (DISI) engines are designed so that some wetting of the piston top occurs during light-load operation. Recent research, as evidenced in "The Effect of In-Cylinder Wall Wetting Location on the HC Emissions from SI Engines", Rudolf Stangimaier, et al. 1999 SAE Technical Paper Series, indicates that piston top wetting contributes significantly to the hydrocarbon emissions from DISI engines.

Catalytic coatings within combustion chambers have been used for ignition of the fuel/air mixture as a result of contact with the catalytic material present in the combustion chamber. This form of catalytic-ignition is described in U.S. Pat. Nos. 4,773,368; 4,811,707; 4,819,595; and 4,905,658, all issued to William C. Pfefferle. More recently, U.S. Pat. No. 5,806,483, issued Sep. 15, 1998, to Mitarai, et al describes a combustion method for preventing the occurrence of knock during engine operation by providing a two-stage combustion process which is substantially different from the normal spark-ignition combustion process. Cracking of carbon-to-carbon bonds in heavier fuel molecules immediately prior to combustion is described in U.S. Pat. No. 4,530,340, granted Jul. 23, 1985, to Millard C. Totman. Totman uses a catalytic coating within the combustion chamber to promote the pre-combustion cracking of the heavier fuel molecules. Earlier, U.S. Pat. No. 2,978,360 was issued to Samuel W. Bradstreet, et al on Apr. 4, 1961 for several specific catalyst formulations and methods for generating and applying catalytic coatings to combustion chamber surfaces. The coatings are provided for the purpose of maximizing the combustion process itself, and as a result of the more efficient combustion, reduced overall emissions.

The present invention is directed to overcoming the problem of piston top wetting and the resultant contribution to hydrocarbon emissions. It is desirable to have a direct injected spark ignition engine that promotes a catalytic reaction at the top of the piston whereby a higher fraction of the fuel which impinges on the piston top is oxidized during the expansion stroke. It is also desirable to have such an engine wherein the detrimental effects of wall wetting on hydrocarbon emissions are reduced.

SUMMARY OF THE INVENTION

In one aspect of the present invention, a method for in-cylinder oxidation of hydrocarbons in a direct injected spark ignition engine includes coating the top surface of a piston with an oxidation catalyst comprising at least one metal selected from the group consisting of palladium, platinum and rhodium. The coated piston is then assembled in a direct injected spark ignition engine, and the engine is operated whereby the coated piston is moved between alternating compression and expansion strokes. A flow of air is directed into the combustion chamber, and a stream of a combustible material comprising a liquid fuel, is injected directly into the combustion chamber and onto the coated top surface of the piston during a compression stroke. The coated top surface of the piston is thereby wetted with a first portion of the liquid fuel. A second portion of the liquid fuel is mixed with the air directed into the chamber and thereby forms a combustible fuel-air mixture within the combustion chamber. An electrical spark is produced within the combustion chamber, thereby igniting and combusting the fuel-air mixture. Subsequently, at least a portion of the remaining first portion of the liquid fuel present on the top surface of the coated piston is oxidized during an expansion stroke of the engine by catalytic reaction between the remaining fuel and the catalytic coating on the top of the piston.

Other features of the method for in-cylinder oxidation of catalysts embodying the present invention includes the top surface of the piston being preferably coated with an oxidation catalyst comprising palladium.

BRIEF DESCRIPTION OF THE DRAWING

A more complete understanding of the structure and operation of the present invention may be had by reference to the following detailed description when taken in conjunction with the accompanying sole drawing FIGURE which is a schematic representation of a direct injected spark ignition combustion chamber having a piston disposed therein in accordance with the method embodying the present invention.

DETAILED DESCRIPTION OF A PRESENTLY PREFERRED EXEMPLARY EMBODIMENT

The present invention is directed to reducing hydrocarbon emissions from direct injected spark ignition engines (DISI) by coating the top of the pistons with a catalytic material. By promoting a catalytic reaction at the piston top, it is possible to oxidize a higher fraction of the fuel which impinges on that surface by directly promoting a combustion at the piston surface and/or by increasing the reactivity of the hydrocarbon molecules so that they can be easily oxidized during the expansion stroke.

In the preferred embodiment of the present invention, a combustion chamber 10 of a DISI engine, as represented in somewhat schematic fashion by the sole drawing FIGURE, has a spark plug 12 and an injection nozzle 14, each of which have a tip, or end portion, projecting into the internal cavity defined by the combustion chamber 10. A piston 16 is reciprocatably mounted within the combustion chamber 10, and is movable in a vertical direction between alternating compression and expansion strokes, or alternatively between intake, compression, expansion and exhaust strokes.

The piston 16 has a coating 18 intimately deposited on the top surface of the piston 16 by conventional coating methods. The catalytic coating 18 is desirably formed of a material that has excellent oxidizing qualities, since the function of the coating is hydrocarbon oxidation or at least partial hydrocarbon oxidation. Furthermore, it is desirable that the catalytic coating 18 on the top of the piston 16 has high oxidation efficiency at low temperature since the piston crown will typically operate in a temperature range of from about 250° C. to about 300° C. during part load operation. Furthermore, it is desirable that the catalytic coating 18 be formed of a material that is resistant to high temperature excursions under high load conditions. Based on the above criteria, a catalyst coating 18 containing one or more metal selected from the group consisting of palladium (Pd), platinum (Pt), and rhodium (Rh) is desirable. Preferably, the catalytic coating 18 is formed of palladium because it has the best low-temperature oxidation efficiency of the three metals.

The method, embodying the present invention, for in-cylinder oxidation of hydrocarbons in direct injected spark ignition engines includes coating the top surface of the piston 16 with an oxidation catalyst 18 comprising at least one metal selected from the group consisting of palladium, platinum, and rhodium. The top-coated piston 16 is then assembled in a direct injected spark ignition engine whereby the piston cooperates with other internal surfaces within the engine to form a combustion chamber 10. The engine is then operated such that alternating strokes are produced by reciprocation of the coated piston 16. A flow of air is directed into the combustion chamber 10 and a stream of a combustible mixture is injected through the injection nozzle 14 directly into the combustion chamber 10 and a portion of the injected fuel impinges onto the coated top surface 18 of the piston 16 during a combustion stroke. The combustible mixture may comprise either a sprayed stream of liquid fuel or a mixture of liquid fuel and injection air. As a result of directing the combustible mixture comprising a liquid fuel directly onto the coated top surface 18 of the piston 16, the coated top surface 18 of the piston 16 is wetted with a first portion of the liquid fuel.

The remaining liquid fuel, comprising a second portion, is mixed with the air previously directed into the chamber 10 whereby a combustible fuel-air mixture is formed within the chamber 10. The combustable fuel-air mixture is subsequently ignited by an electrical spark provided by the spark plug, or similar spark ignition device, 12 positioned within the chamber 10. Upon ignition, the fuel-air mixture is combusted and a portion of the first portion of liquid fuel disposed on the top surface 18 of the piston 16 is vaporized.

Combustion of the fuel-air mixture forces the piston 16 downwardly in an expansion stroke. During the expansion stroke, at least a portion of any remaining unburned or partially burned portion of the first portion of liquid fuel present on the top surface 18 of the coated piston 16 is subsequently oxidized as a result of catalytic reaction between the remaining fuel and the catalytic coating 18 on the top of the piston 16.

The method for in-cylinder oxidation of hydrocarbons, embodying the present invention, requires that liquid fuel be deposited on the top of a piston disposed in a direct injected spark ignition engine as a direct result of in-cylinder fuel injection. Liquid fuel deposition on the piston top does not occur in fully warmed-up port-fuel injected or carburetted engines. It is known that the liquid fuel deposition on the piston top of DISI engines contributes to the higher emission of hydrocarbons than are emitted from comparable port-fuel injected or carburetted engines. In the method embodying the present invention, the catalytic coating 18 on the top of piston 16, which is disposed in a DISI engine, breaks down the fuel molecules and the resulting hydrocarbon molecules have increased reactivity so that they are more easily oxidized in a post-flame oxidation process.

Although the present invention is described in terms of a preferred exemplary embodiment, those skilled in the art will recognize that changes in the exemplary embodiment may be made without departing from the spirit of the invention. Such changes are intended to fall within the scope of the following claims. Other aspects, features, and advantages of the present invention may be obtained from a study of this disclosure and the drawing, along with the appended claims.

What we claim is:

1. A method for in-cylinder oxidation of hydrocarbons in direct injected spark ignition engines, comprising:

coating the top surface of a piston with an oxidation catalyst comprising at least one metal selected from the group consisting of palladium, platinum, and rhodium;

assembling the coated piston in a direct injected spark ignition engine and thereby forming a combustion chamber in the engine;

operating said engine whereby alternating strokes are produced by reciprocation of said coated piston;

directing a flow of air into the combustion chamber;

injecting a stream of combustible material comprising a liquid fuel directly into said combustion chamber and onto the coated top surface of said piston, thereby wetting the coated top surface of the piston with a first portion of the liquid fuel;

mixing a second portion of the liquid fuel with the air directed into said chamber and forming a combustible fuel-air mixture within said combustion chamber;

producing an electrical spark within the combustion chamber by an electrical spark ignition device positioned within the chamber, thereby igniting the fuel-air mixture present in the combustion chamber and vaporizing a portion of the first portion of liquid fuel disposed on the top surface of the piston; and subsequently oxidizing at least a portion of the remaining nonvaporized portion of the first portion of liquid fuel present on the top surface of said coated piston during an expansion stroke of the engine by catalytic reaction between said remaining fuel and the catalytic coating on the top of the piston.

2. A method for in-cylinder oxidation of hydrocarbons, as set forth in claim 1, wherein said coating the top surface of a piston with an oxidation catalyst includes coating the top surface of the piston with palladium.

\* \* \* \* \*